US008900356B2

(12) United States Patent
Bouhanna

(10) Patent No.: US 8,900,356 B2
(45) Date of Patent: Dec. 2, 2014

(54) FILTER ASSEMBLY WITH SOUND ATTENUATION MEMBER AND RELATED METHOD OF MANUFACTURE

(71) Applicant: Mann+Hummel GmbH, Ludwigsburg (DE)

(72) Inventor: Greg Bouhanna, Richland, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 66 days.

(21) Appl. No.: 13/650,195

(22) Filed: Oct. 12, 2012

(65) Prior Publication Data

US 2014/0102304 A1 Apr. 17, 2014

(51) Int. Cl.
*B01D 46/00* (2006.01)
*F02M 35/14* (2006.01)

(52) U.S. Cl.
CPC *F02M 35/14* (2013.01); *Y10S 55/05* (2013.01)
USPC ........... 96/384; 55/385.3; 55/498; 55/DIG. 5; 29/428

(58) Field of Classification Search
USPC ........... 55/320, 428, 498, 502, 503, 504, 497, 55/385.3, DIG. 5; 264/299, DIG. 48; 96/380, 383, 386; 123/198 E
See application file for complete search history.

(56) References Cited

U.S. PATENT DOCUMENTS

| | | | | | |
|---|---|---|---|---|---|
| 4,713,097 | A * | 12/1987 | Grawi et al. | .................... | 96/380 |
| 5,059,221 | A * | 10/1991 | McWilliam | ...................... | 96/380 |
| 5,112,372 | A | 5/1992 | Boeckermann et al. | | |
| 6,419,718 | B1 * | 7/2002 | Klug et al. | ....................... | 55/320 |
| 2013/0263744 | A1 * | 10/2013 | Osendorf et al. | ............... | 96/380 |

* cited by examiner

*Primary Examiner* — Duane Smith
*Assistant Examiner* — Minh-Chau Pham
(74) *Attorney, Agent, or Firm* — James Hasselbeck

(57) ABSTRACT

An air filter assembly for an engine includes a filter element, a sound attenuation member and an end cap. The filter element may be a cylindrical filter element defining a hollow interior. The sound attenuation member may extend into the hollow interior of the cylindrical filter element. The sound attenuation member may include a flange at a first end thereof. The flange may have a diameter greater than a diameter of the hollow interior. The end cap may be secured to the cylindrical filter element and may function to fix the sound attenuation member relative to the filter member. The sound attenuation member is operative for reducing engine noise travelling through the air filter assembly.

22 Claims, 6 Drawing Sheets

FILTER ASSEMBLY WITH SOUND ATTENUATION MEMBER AND RELATED METHOD OF MANUFACTURE

FIELD

The present disclosure generally relates to filter assemblies. More particularly, the present disclosure relates to a filter assembly for an engine incorporating a sound attenuation member. The present disclosure also more particularly relates to a method of manufacturing a filter assembly for an engine.

BACKGROUND

This section provides background information related to the present disclosure which is not necessarily prior art.

Air filters may be used in conjunction with an engine to provide the engine with a constant supply of clean air during use. For example, an air filter may be positioned upstream of an internal combustion engine in a vehicle to supply an intake manifold of the vehicle and, thus, the internal combustion engine, with clean air. The internal combustion engine utilizes the air supplied by the intake manifold and air filter and mixes the air with fuel during combustion. Providing the air filter upstream of the intake manifold and internal combustion engine improves the efficiency of the engine and prevents damage to the engine by reducing the intake of solid particulate such as dust, dirt, and other debris into combustion chambers of the internal combustion engine.

Air filters typically include a filter media disposed within a housing that permits the passage of air therethrough between an inlet and an outlet. The filter media is typically configured to allow air to pass from the inlet to the outlet while concurrently removing solid particulate from the air flow. Once cleaned, the air is drawn from the housing and into the intake manifold for use by the engine during combustion while the solid particulate remains in the filter media and/or housing of the air filter.

Under normal operating conditions, a conventional air filter adequately removes solid particulate from incoming air prior to expelling cleansed air to the intake manifold and the internal combustion engine. However, over time and/or when operating in dusty, sandy, or otherwise debris-laden environments, the filter media may become clogged with solid particulate, thereby reducing the effectiveness of the filter media in removing solid particulate from an air flow. Further, when the filter media becomes laden with solid particulate, air flow through the filter is reduced. As a result, the volume of clean air provided to the engine is insufficient, thereby reducing the efficiency of the engine. Only when the air filter is permitted to concurrently remove solid particulate from air entering the air filter and provide the engine with a sufficient volume of clean air does the engine operate efficiently. It is therefore desirable that such filters be readily replaceable.

In certain applications, engine noise may travel back through the air filter. It can be advantageous to reduce or attenuate such transmitted engine noise. It has heretofore been generally proposed to reduce such engine noise with a sound attenuation device.

While known air filters have proven to be generally acceptable for their intended purpose, a need for improvement in the relevant art exists.

SUMMARY

This section provides a general summary of the disclosure, and is not a comprehensive disclosure of its full scope or all of its features.

In accordance with one particular application, the present teachings provide an air filter assembly for an engine including a filter element, and advantageously including or in some embodiments fixedly integrating a sound attenuation member therein. The filter element may be a cylindrical filter element defining a hollow interior, or alternately maybe of an oblong, elliptical or other cross-sectional configuration. The sound attenuation member may extend into the hollow interior of the cylindrical filter element. The sound attenuation member may include a flange at a first end thereof. The flange may have a diameter greater than a diameter of the hollow interior. The end cap may be secured to the cylindrical filter element and may function to fix the sound attenuation member relative to the filter member. The sound attenuation member may be operative for reducing engine noise travelling through the air filter assembly.

In accordance with another particular application, the present teachings similarly provide an air filter assembly for an engine including a filter element and a sound attenuation member. The filter element may be a cylindrical filter element defining a hollow interior. The sound attenuation member may extend into the hollow interior of the cylindrical filter element and include a flange at a first end thereof. The flange may have a diameter greater than a diameter of the hollow interior. A disk element may be secured to the filter element and may axially support the flange at a first side thereof. A molded element may be molded to the disk element and may at least partially overlap a second side of the flange. The sound attenuation member may be operative for reducing engine noise travelling through the air filter assembly.

In accordance with yet another particular application, the present teachings provide a method of manufacturing an air filter assembly for an engine. The air filter assembly has a generally cylindrical filter element defining a hollow interior. The method includes securing a first portion of an end cap to the filter assembly and providing a sound attenuation member having a flange with a diameter greater than a diameter of the hollow interior. The method additionally includes extending the sound attenuation member into the hollow interior such that the flange is supported in an axial direction by the first portion of the end cap. The method further includes fixing the sound attenuation member relative to the filter assembly with a second portion of the end cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
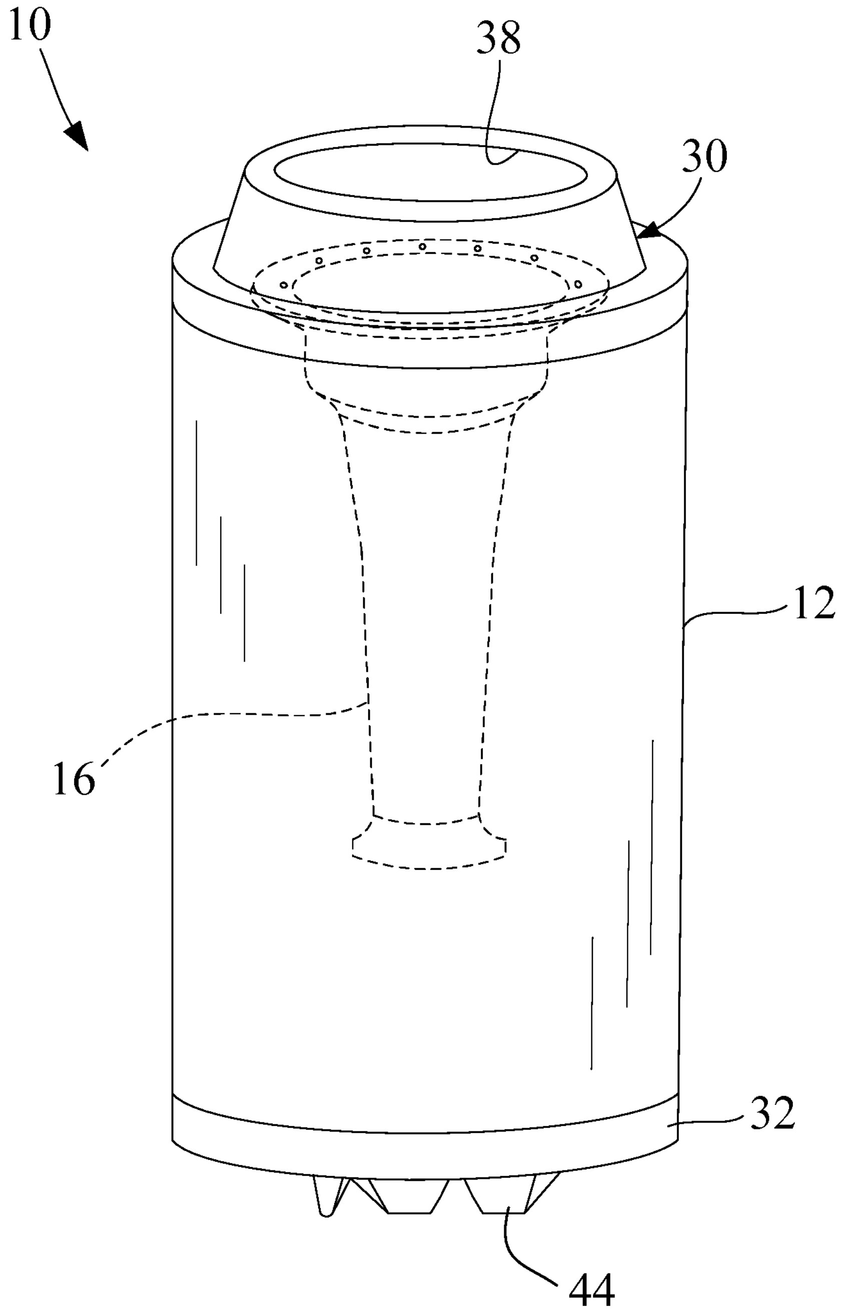
FIG. 1 is a perspective view of a filter assembly with a sound attenuation member constructed in accordance with the present teachings.
Figure 2:
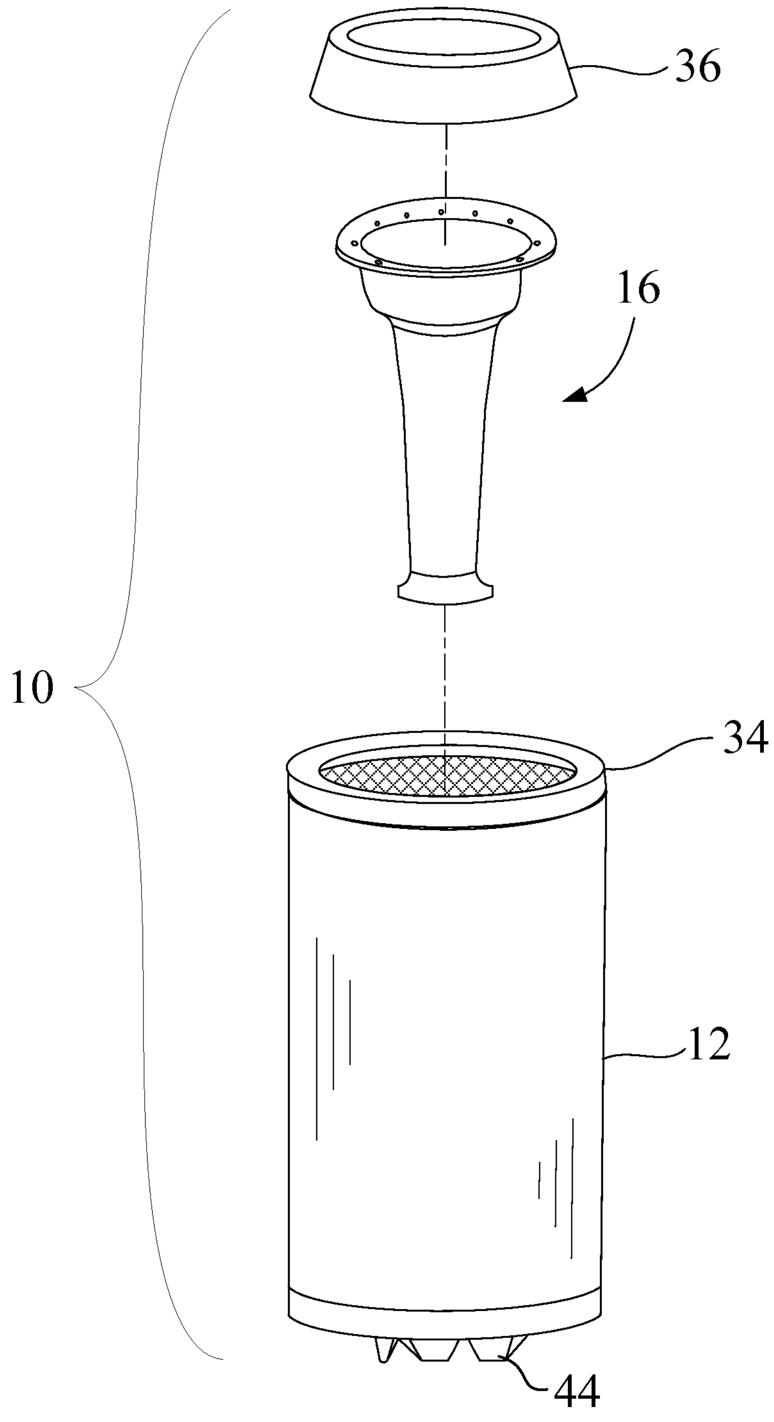
FIG. 2 is an exploded view of the filter assembly of FIG. 1.
Figure 3:
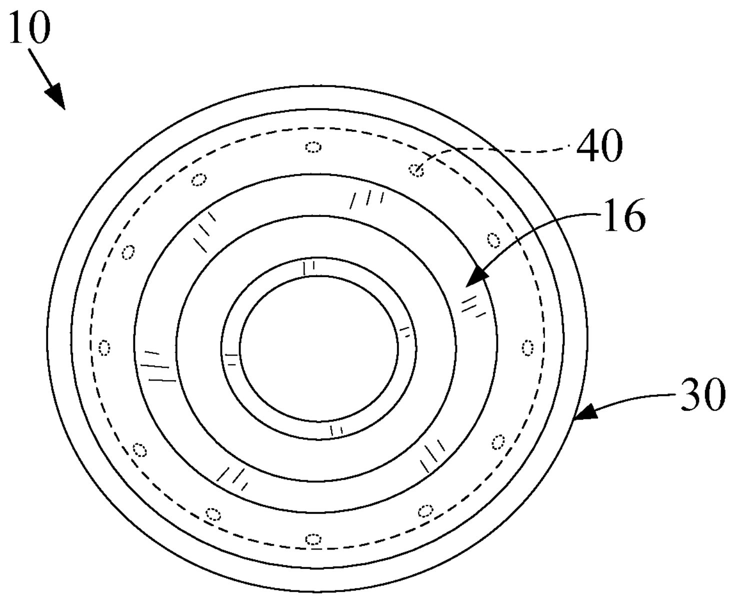
FIG. 3 is an end view of the filter assembly of FIG. 1.

Example embodiments will now be described more fully with reference to the accompanying drawings in which the elements of the various views are drawn to scale.

Example embodiments are provided so that this disclosure will be thorough, and will fully convey the scope of the present teachings to those of ordinary skill in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With general reference to FIGS. 1-5, an air filter assembly constructed in accordance with the present teachings is illustrated and generally identified at reference character 10. In the exemplary embodiment illustrated, the filter assembly 10 is intended to be used to filter intake air delivered to an internal combustion engine. For example, the filter assembly 10 may be used in connection with an internal combustion engine of a motor vehicle. It will be understood, however, that the present teachings may be adapted for other applications, including but not limited to stationary applications, where it is desired to reduce noise that may pass through the filter assembly 10.

The filter assembly 10 is illustrated to generally include a filter element 12. The filter element may be a pleated, generally cylindrical filter element 12. The filter element 12 may define a hollow interior 14 having a diameter $D_1$.

The filter assembly 10 is additionally illustrated to include a sound attenuation member 16. As illustrated perhaps most clearly in the cross-sectional view of FIG. 4, the sound attenuation member 16 may extend into the hollow interior 14 of the filter element 12. The sound attenuation member 16 is operative for reducing noise (e.g., engine noise) travelling through the air filter assembly 10.

The sound attenuation member 16 includes a first end 18 proximate a first end 20 of the filter element 12 and a second end 22 disposed in the hollow interior 14 of the filter element 12. The first end 18 may include a flange 24. The flange 24 may have an outer diameter $D_2$ (see FIG. 5) and may define a central opening having a diameter $D_3$ (see FIG. 4). The outer diameter D2 of the flange 18 is preferably larger than the diameter of the hollow interior of the filter element 12 such that the sound attenuation member 16 may be supported on the first end 20 of the filter element 12, or alternately by abutting against, resting directly upon a disk element 34 of the filter element 12. The disk element may be of a hard plastic material or a molded polyurethane material. The disk element 34 may be molded directly onto the axial end of the filter media of the filter element 12. The end disk is annular defining a central opening through which the sound attenuation member 16 is received into the hollow interior 14 of the filter element 12. Prefereably the sound attenuation member 16 forms a seal with the disk element 34 such that air flowing though the filter element 12 is restricted to pass through the open interior of the sound attenuation member 16 to enter or exit the filter element 10 at the first end 20.

The sound attenuation member 16 generally converges from the first end 18 in the direction of the second end 22 to a throat 26. Intake air flow is drawn through the second end 22 and exits the first end 18 in the direction of arrow A.

The sound attenuation member 16 may be used with various sized filter elements 12. Where the opening of the filter element 16 is larger than that shown in the drawings, the flange 24 may be increased in diameter.

The filter assembly 10 is further illustrated to generally include first and second end caps 30 and 32. As will become more apparent below, the first end cap 30 is secured to the cylindrical filter element 12 and functions to fix the sound attenuation member 16 to the filter member 12. As shown in the embodiment illustrated, the first end cap 30 may include a first portion 34 and a second portion 36. Preferably the second portion 36 comprises an elastomeric material suitable for forming a seal with the interior of the housing.

The first portion of the end cap 30 may be a disk element 34. The disk element 34 may be generally toroidal or annular in shape and may define an open inner diameter and an outer diameter. The disk element 34 may be made of a molded elastomeric foam such as a polyurethane foam or alternatively may be made of any other moldable plastic material. Preferably, the disk element 34 is permanently secured onto the filter media of the filter element 12 such as by an adhesive or by embedding the edges of the filter media 12 into the disk element 34. In some embodiments the end cap 30 is fixedly secured to the end cap 30 during the molding process to fixedly secured the filter element 12 and sound attenuation member 16 together as a unitary one-piece exchangeable filter component.

Figure 4:
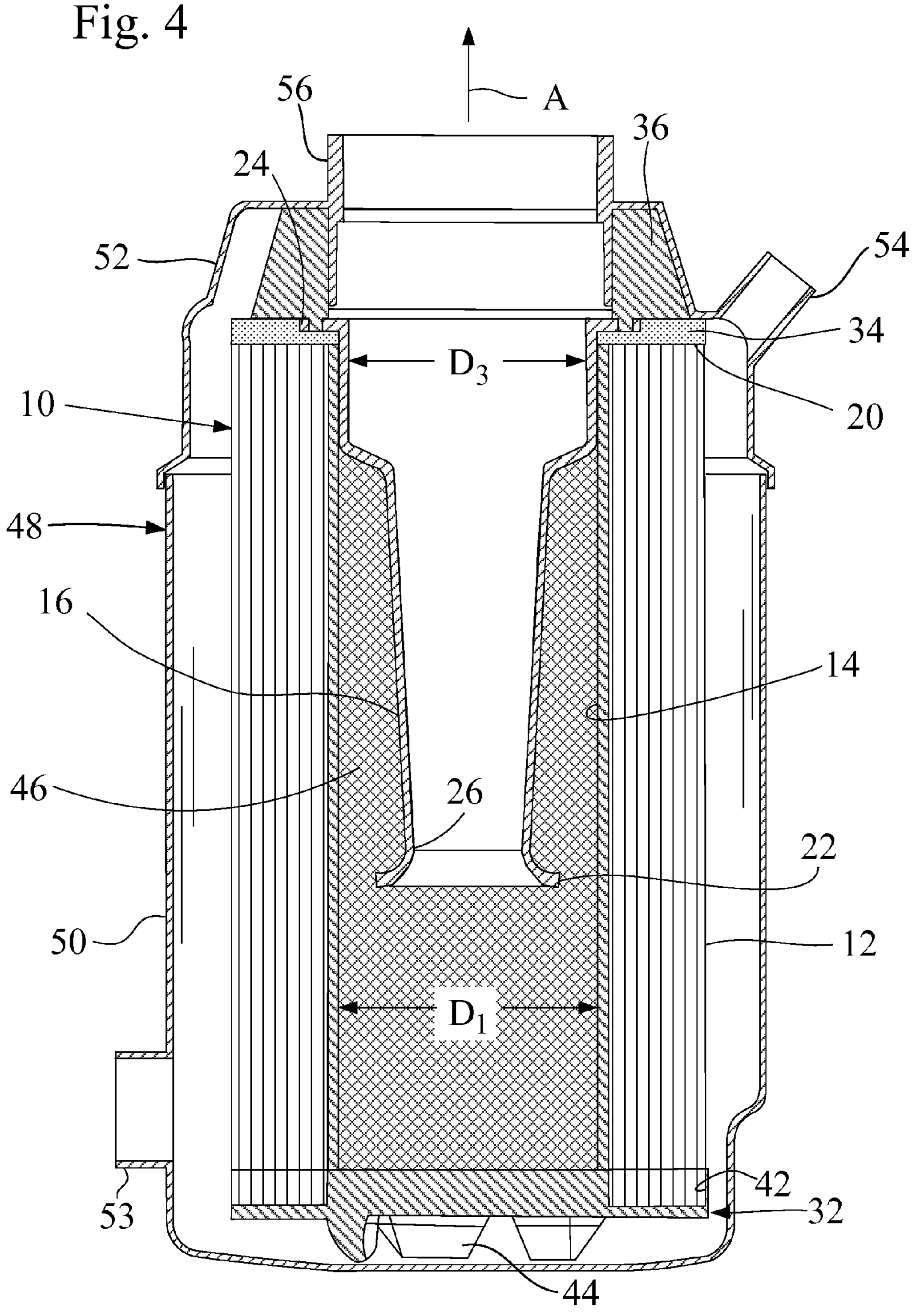
FIG. 4 is a cross-sectional view of the filter assembly of FIG. 1 taken along the line 4-4 of FIG. 3, the filter assembly shown operatively associated with a housing.
Figure 5:
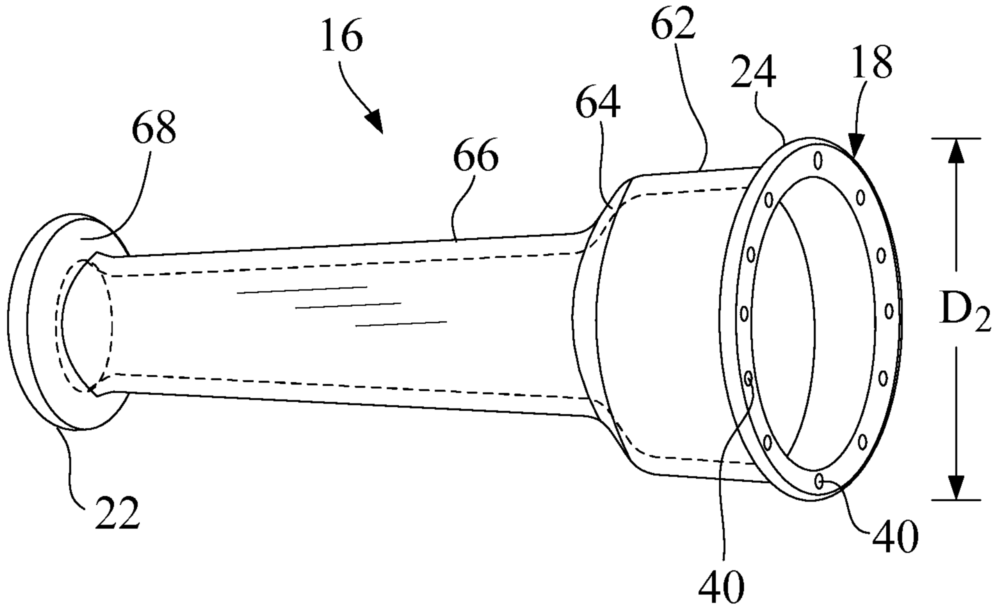
FIG. 5 is a perspective view of the sound attenuation member of FIG. 1, the sound attenuation member removed from the remainder of the filter assembly for purposes of illustration.

With particular reference to the cross-sectional view of FIG. 4, the axial direction of the filter element is generally indicated by the direction of arrow A. The flange 24 of the sound attenuation member 16 is axially supported on the first portion 34 of the end cap 30 at a first side of the flange. The inner diameter of the first portion or disk element 34 may be less than the diameter $D_2$ of the flange 24. The outer diameter of the first portion 34 may be greater than the diameter $D_2$ of the flange 24. As illustrated, the first portion 34 of the end cap 30 may be formed to include a recess sized to receive the flange 24. It will be understood, however, that the first portion 34 may alternatively include a flat upper surface (i.e., without a recess) against which the flange 24 is axially supported. The recess may be provided in a face of the second portion 36 abutting or facing the disk element 34.

The second portion 36 of the end cap 30 may be secured to the first portion 34 or both the first portion 34 and the flange 24. In the embodiment illustrated, the second portion 36 defines a central opening 38 having a diameter greater than the diameter $D_1$ of the hollow interior of the filter element 12 and less than the diameter $D_2$ of the flange 24. Further in the embodiment illustrated, the second portion 36 of the end cap 30 may be a molded element molded to the disk element 34. The second portion 36 of the end cap 30 is preferably a molded elastomeric polyurethane foam, although other known elastic materials suitable for forming a seal with a filter housing may be used as known to those skilled in the art. Alternatively, the second portion 36 may be adhesively secured to the first portion 34 or both the first portion 34 and the flange 24 or secured in any well-known matter within the scope of the present teachings.

Preferably the second portion 36 of the end cap 30 is molded directly onto the disk element 34 of the filter element 12, embedding and fixing the flange 18 of the sound attenuation member 16 therebetween, forming a unitary one-piece exchangeable filter module that is installed and removed as a one-piece module from housing 48, such as during service. Preferably the molded material of the second portion 36 flows into and through the holes 40 of the flange 18 to further mechanically bind and secure the sound attenuation member 16 to the end cap 30 and fixedly mount in fixed position within the hollow interior of the filter element 12. In other embodiments of the invention the sound attenuation member 16 may be a separate component removable from the filter element 12 through the open interior of the end cap 30, for example, during service replacement or exchange of the filter element 12.

The flange 24 may be formed to include a plurality of openings 40. The openings 40 may extend partially through or completely through the flange 24. Where the second portion 36 of the end cap 30 is a molded element, it may be molded to the disk element 34 and may at least partially overlap a second side of the flange 24. Further where the second portion 36 of the end cap 30 is a molded element, material of the second portion may seep into the openings 40 (see FIG. 4).

As shown, the flange 24 of the sound attenuation member 16 may be axially captured between the first and second portions 34 and 36 of the first end cap 30. Preferably the flange 24 is received into the recess between the first 34 and second portion 36 to receive support fixing the position of the sound attenuation member 16 within the hollow interior 14 of the filter element 12. The first portion 34 of the end cap 30 is disposed adjacent a first side of the flange 24 and the second portion 36 of the end cap 30 is disposed adjacent a second side of the flange 34. In the embodiment illustrated, the sound attenuation member 16 is fixedly embedded into the first end cap 30.

The second end cap 32 is secured to the filter element 12 proximate a second end 42 of the filter element 12. The second end cap 32 may be formed of an elastomeric material such as molded polyurethane, rubber or any suitable materials. The second end cap 32 may include one or more axially outwardly projecting feet 44. The feet 44 may be elastomeric or compressible in an axial direction and may abut onto the inner surface at the proximate axial end of the filter housing to provide axial support to the filter element 12 within the housing.

The filter assembly 10 may further include a support member 46 disposed in the hollow interior of the filter element 12 for radially supporting the generally cylindrical filter element 12 against forces induced on the filter media by fluid flow as well as axial forces transmitted between the end caps. The support member 46 may be constructed of an expanded metal, a plastic mesh, a perforated plastic or metal tube or other air permeable tubular support materials. The support member 46 may extend axially substantially along the entire length of the filter element 12.

With particular reference to the cross-sectional, environmental view of FIG. 4, the filter assembly 10 is shown operatively associated with a housing 48. It will be understood that the housing 48 shown in the drawings is merely exemplary for an enabling exemplary disclosure. Insofar as the present teachings are concerned, the construction of the housing 48 is conventional and will be described herein only to the extent necessary to understand its' cooperation with the filter assembly 10.

The housing 48 is illustrated to include a main body portion 50. The housing 48 further includes a cover 52 removably secured to the main body portion 52. The main body portion 50 defines an air intake port 53. The cover 52 may include an outlet 54 for ejecting solid particulates and an air outlet port 56, preferably centrally arranged with the central axis of the open interior of the filter element 12.

With the cover 52 removed from the main body portion 50, the air filter assembly 10 may be inserted into the main body portion 50 or removed from the main body portion 50. When the cover 52 is secured to the main body portion 50 (e.g., with clamps), the feet 44 of the second end cap 32 may be axially compressed, thereby providing an axial force urging the first end cap 30 to for a seal axially and/or radially with the air outlet port 56 and/or cover 52. The molded element 36 of the first end cap 30 may also be compressed.

In a preferred embodiment the sound attenuation member 16 includes a hollow, axially extending throat member having a generally cylindrical portion 62 secured to and extend axially inwardly from the flange 18. The generally cylindrical portion 62 transitions to a generally conical or otherwise tapered portion 64 of the throat member which has an internal diameter which generally tapers or decreases from the generally cylindrical portion 62 to the opposing end of the generally conical or otherwise tapered portion 64. The opposing end of the generally conical or otherwise tapered portion 64 transitions to a generally conical extended throat portion 66 which may have an internal diameter that tapers, at least in portions thereof, from the opposing end of the generally conical or otherwise tapered portion 64 towards an opposing end of the generally conical extended throat portion 66. In some aspects of the invention, the generally conical extended throat portion 66 may be cylindrical, non-tapering. The opposing end of the generally conical extended throat portion 66 may transition to a radially outwardly flared end 68 which has an internal diameter of the hollow throat that increases in a direction from the generally conical extended throat portion 66 to the second end 22 of the sound attenuation member 16. In the illustrated embodiment, the sound attenuation member 16 may be seen as having a general wine glass stem shape, although other configurations are possible.

The tapering internal diameters of the generally conical extended throat portion 66 together with the length of the generally conical extended throat portion 66, together with the tapering internal diameters of the generally conical or otherwise tapered portion 64 and the axial length of the generally conical or otherwise tapered portion 64 are advantageously determined, tuned or calibrated through engineered design, testing and/or together with computational fluid dynamics modeling to result in the attenuation of a desired specific range of sound frequencies generated by the engine. The tapering diameters of the throat portion 66 of the sound attenuation member 16 are operable to attenuate undesired frequency ranges of sound by reflecting back a portion of the undesired sound back to the engine. Additionally, a portion of the reflected sound may later be reflected again back to the sound attenuation member 16, however at least a portion of this sound is likely to be out of phase with the unreflected sound and at therefore at least partially cancelled. By this process, the throat shape, diameters and lengths of the sound attenuation member 16 may be engineered or calibrated to reduce the transmitted noise levels of undesired frequencies of sound, thereby reducing engine noise apparent in the outside environment.

Figure 6:
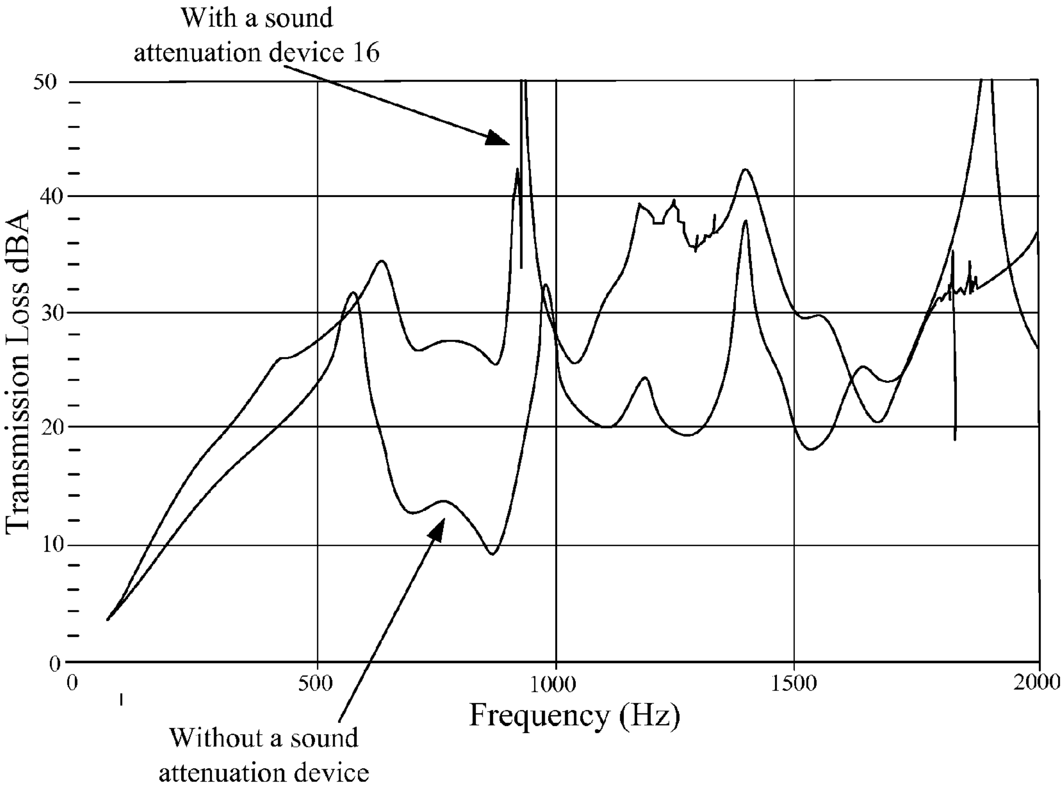
FIG. 6 is a table is illustrating sound transmission loss as a function of frequency for a common filter assembly including a sound attenuation device of the present teachings and excluding a sound attenuation device.

Turning to FIG. 6, a table is provided illustrating sound transmission loss (dB) as a function of frequency (Hz). A first filter assembly tested included the sound attenuation device 16 described herein. A second filter assembly tested was identical except that it did not include a sound attenuation device. The sound attenuation device 16 is shown to have increased the sound transmission loss across the operating frequency range.

In use, intake air enters the housing 48 through the air intake port 53. The air circumferentially circulates around the filter element 12 in a space between the filter element 12 and the housing. The air radially passes through the filter element 12 into the hollow interior 14. From the hollow interior 14, the air axially passes through the sound attenuation member 16 to the engine. Any noise coming back from the engine (e.g., in a direction opposite to arrow A) is reduced by the sound attenuation member 16.

It will now be understood that the present teachings provide an air filter assembly in which a sound attenuation device is integrated such that the filter element and sound attenuation device may be removed as a unit. In other embodiments the sound attenuation device is fixedly and permanently integrated with the filter element such that the filter element and sound attenuation device form a unitary one-piece component that is exchangeable during service.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air filter assembly for an engine, the air filter assembly comprising:

a cylindrical filter element defining a hollow interior;

a sound attenuation member extending into the hollow interior of the cylindrical filter element, the sound attenuation member including a flange at a first end thereof, the flange having a diameter greater than a diameter of the hollow interior; and an end cap secured to the cylindrical filter element and fixing the sound attenuation member relative to the filter member;

wherein the sound attenuation member is operative for reducing engine noise travelling through the air filter assembly;

wherein the sound attenuation member includes a hollow axially extending throat member radially closing an axial throat passage therein, the axial throat passage extending from a first axial end of the sound attenuation member to an opposing second axial end;

a first axially open end of the throat passage opening axially through the first axial end of the sound attenuation member;

an opposing second axially open end of the throat passage opening axially through the second axial end of the sound attenuation member to open into the hollow interior of the filter element for airflow between the throat passage and the hollow interior of the filter element;

wherein the sound attenuation member closes the axial throat passage radially from the first axial end to the second axial end of the sound attenuation member;

wherein the hollow axially extending throat member includes:

a hollow generally cylindrical portion having a first axial end secured to and extending axially inwardly from the flange;

wherein the hollow generally cylindrical portion at an opposing axial end transitions to a hollow generally conical or tapered portion of the throat member having an internal throat passage diameter that generally tapers or decreases from the generally cylindrical portion axially towards the opposing second axial end of the sound attenuation member;

wherein an axial end of the generally conical or tapered portion at the second axial end of the sound attenuation member has a radially outwardly flared end portion arranged at and radially surrounding the second axially open end of the throat passage.

2. The air filter assembly of claim 1, wherein the sound attenuation member is fixedly embedded into the end cap, providing a unitary one-piece air filter with sound attenuation component exchanged or replaced as a unit.

3. The air filter assembly of claim 1, wherein the end cap includes a first portion and a second portion and further wherein the flange is axially captured between the first and second portions.

4. The air filter assembly of claim 1, wherein the second portion of the end cap is molded to the first portion and molded at least partially over the flange.

5. The air filter assembly of claim 1, wherein the flange includes a plurality of openings.

6. The air filter assembly of claim 1, wherein the second portion of the end cap is constructed of a material that seeps into the openings of the flange.

7. The air filter assembly of claim 1, further comprising a support member disposed within the hollow interior for radially supporting the generally cylindrical filter element.

8. The air filter assembly of claim 1, wherein the support member is an expanded metal member radially disposed between the sound attenuation member and the generally cylindrical filter element.

9. An air filter assembly for an engine, the air filter assembly comprising:

a cylindrical filter element defining a hollow interior;

a sound attenuation member extending into the hollow interior of the cylindrical filter element, the sound attenuation member including a flange at a first end thereof, the flange having a diameter greater than a diameter of the hollow interior;

a disk element secured to the filter element and axially supporting a first side of the flange;

a molded element molded to the disk element and molded to at least partially overlap a second side of the flange;

wherein the sound attenuation member is operative for reducing engine noise travelling through the air filter assembly;

wherein the sound attenuation member includes a hollow axially extending throat member radially closing an axial throat passage therein, the axial throat passage extending from a first axial end of the sound attenuation member to an opposing second axial end;

a first axially open end of the throat passage opening axially through the first axial end of the sound attenuation member;

an opposing second axially open end of the throat passage opening axially through the second axial end of the sound attenuation member to open into the hollow interior of the filter element for airflow between the throat passage and the hollow interior of the filter element;

wherein the sound attenuation member closes the axial throat passage radially from the first axial end to the second axial end of the sound attenuation member;

wherein the sound attenuation member has a radially outwardly flared end portion arranged at and radially surrounding the second axially open end of the throat passage.

10. The air filter assembly of claim 1, wherein the flange of the sound attenuation member is axially captured between the molded element and the disk element.

11. The air filter assembly of claim 1, wherein the disk element includes a central opening receiving the sound attenuation member, the central opening having a diameter less than the flange.

12. The air filter assembly of claim 1, wherein the molded element defines a central opening having a diameter greater than the hollow interior and less than the flange.

13. The air filter assembly of claim 1, wherein the flange includes a plurality of openings.

14. The air filter assembly of claim 1, wherein the molded element seeps into the openings of the flange, fixedly and permanently securing said flange and said sound attenuation member in fixed position within said hollow interior of said filter element.

15. The air filter assembly of claim 1, further comprising a support member disposed within the hollow interior for radially supporting the generally cylindrical filter element.

16. The air filter assembly of claim 1, wherein the support member is an expanded metal member radially disposed between the sound attenuation member and the generally cylindrical filter element.

17. A method of manufacturing an air filter assembly for an engine, the air filter assembly having a generally cylindrical filter element defining a hollow interior, the method comprising:

securing a first portion of an end cap to the filter assembly;

providing a sound attenuation member having a flange with a diameter greater than a diameter of the hollow interior;

wherein the sound attenuation member includes a hollow axially extending throat member radially closing an axial throat passage therein, the axial throat passage extending from a first axial end of the sound attenuation member to an opposing second axial end;

a first axially open end of the throat passage opening axially through the first axial end of the sound attenuation member;

an opposing second axially open end of the throat passage opening axially through the second axial end of the sound attenuation member to open into the hollow interior of the filter element for airflow between the throat passage and the hollow interior of the filter element;

wherein the sound attenuation member closes the axial throat passage radially from the first axial end to the second axial end of the sound attenuation member;

wherein the sound attenuation member has a radially outwardly flared end portion arranged at and radially surrounding the second axially open end of the throat passage;

extending the sound attenuation member into the hollow interior such that the flange is supported in an axial direction by the first portion of the end cap; and fixing the first axial end of the sound attenuation member relative to the filter assembly with a second portion of the end cap such that the second axially open end of the throat passage opens into the hollow interior of the filter element.

18. The method of manufacturing an air filter assembly of claim 17, wherein fixing the sound attenuation member relative to the filter assembly includes axially capturing the flange between the first and second portions of the cap.

19. The method of manufacturing an air filter assembly of claim 17, wherein fixing the attenuation member includes molding the second portion to the first portion such that the second portion is molded at least partially over the flange.

20. The method of manufacturing an air filter assembly of claim 17, wherein the flange includes a plurality of openings and fixing the attenuation member includes molding the second member over at least a portion of the flange such that a material of the second portion seeps into the openings.

21. An air filter assembly for an engine, the air filter assembly comprising:

a filter housing enclosing an interior chamber and a including a removable cover;

a cylindrical filter element arranged within said interior chamber of said filter housing, said filter element defining a hollow interior;

a sound attenuation member extending into the hollow interior of the cylindrical filter element, the sound attenuation member including a flange at a first end thereof, the flange having a diameter greater than a diameter of the hollow interior;

wherein the sound attenuation member includes a hollow axially extending throat member radially closing an axial throat passage therein from a first axial end of the sound attenuation member to an opposing second axial end;

a first axially open end of the throat passage opening axially through the first axial end of the sound attenuation member;

an opposing second axially open end of the throat passage opening axially through the second axial end of the sound attenuation member to open into the hollow interior of the filter element for airflow between the throat passage and the hollow interior of the filter element;

wherein the sound attenuation member has a radially outwardly flared end portion arranged at and radially surrounding the second axially open end of the throat passage;

a disk element secured to the filter element and axially supporting a first side of the flange;

a molded element molded to the disk element and molded to at least partially overlap a second side of the flange;

wherein said filter element and sound attenuation member are detachably and reattachably connected to, removable from and reinstallable into said filter housing;

wherein the flange of the sound attenuation member is axially captured between the molded element and the disk element;

wherein the sound attenuation member is operative for reducing engine noise travelling through the air filter assembly.

22. The air filter assembly according to claim 21, wherein wherein the flange includes a plurality of openings;

said molded element seeps into and mountably cures into said openings of said flange, fixedly and permanently securing said flange and said sound attenuation member in fixed position within said hollow interior of said filter element;

wherein said filter element and said sound attenuation member are permanently secured forming a unitary, one-piece component removed from and installed to said filter housing as a unitary component.

* * * * *